Patented June 24, 1930

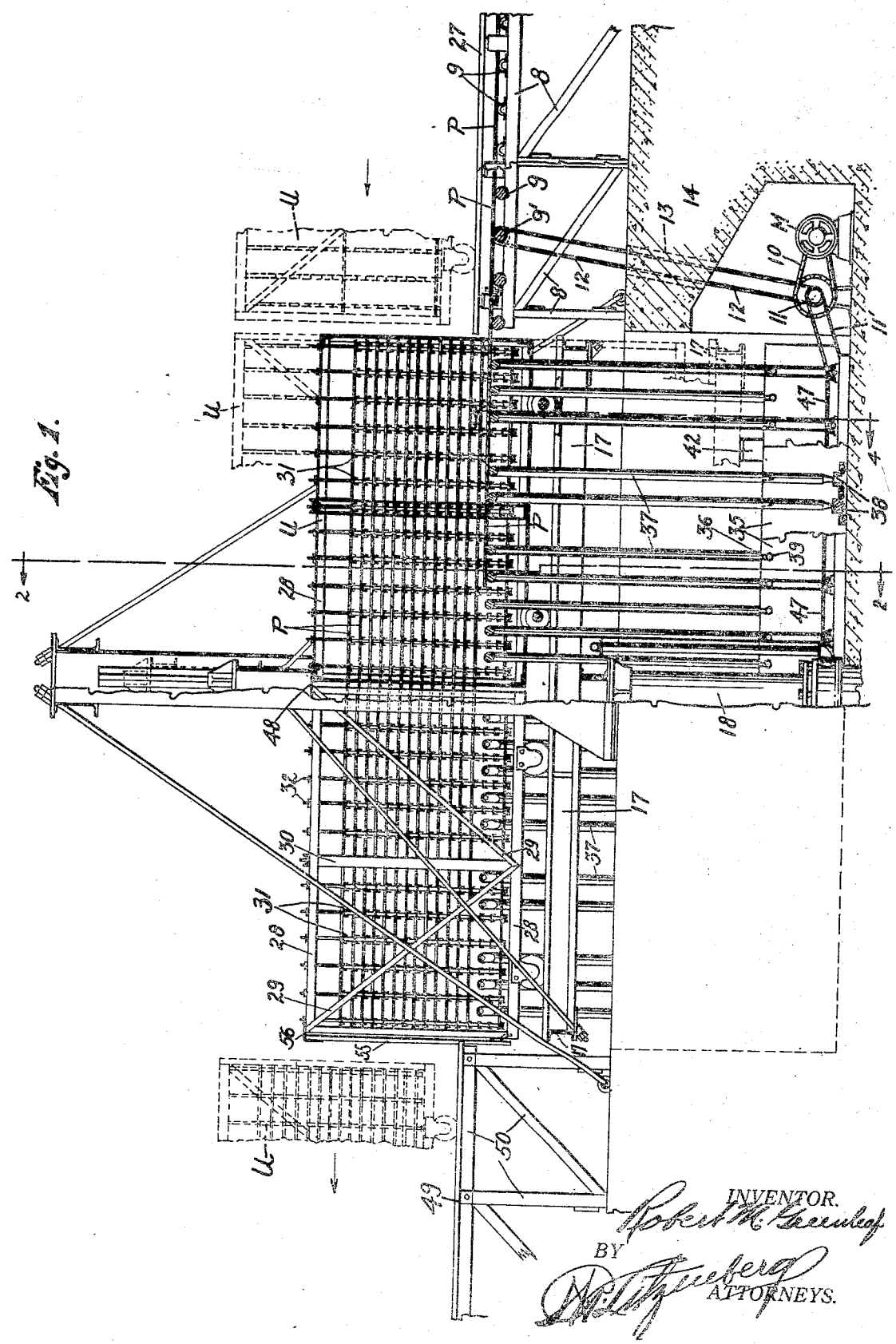

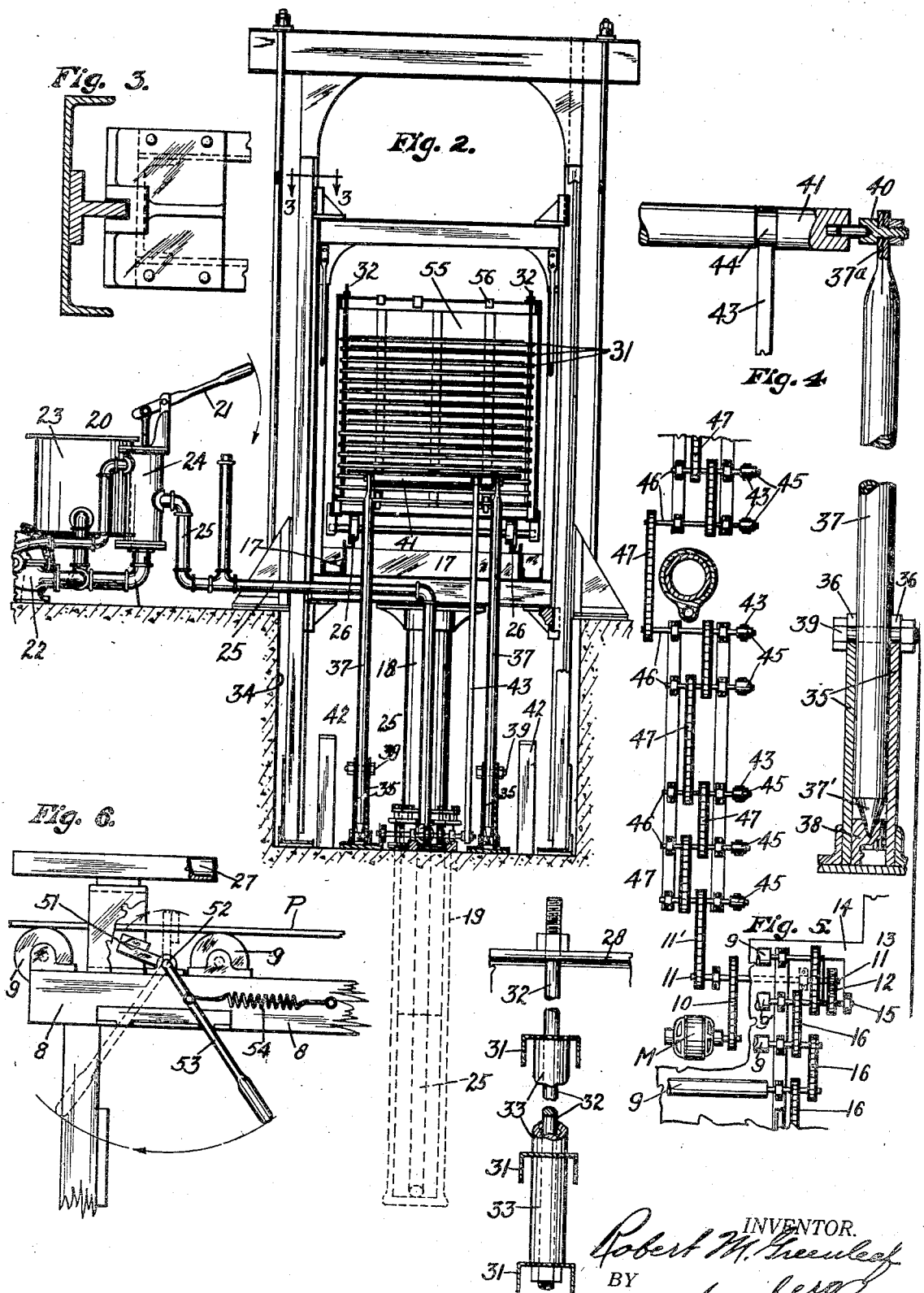

1,766,251

UNITED STATES PATENT OFFICE

ROBERT M. GREENLEAF, OF LOS ANGELES, CALIFORNIA, ASSIGNOR TO PLASTOID PRODUCTS, INC., OF LOS ANGELES, CALIFORNIA, A CORPORATION

MEANS FOR HANDLING WET WALL BOARD AND THE LIKE

Application filed April 21, 1927. Serial No. 185,477.

My invention relates to handling wet wall board, plaster lath and the like, and it has among its salient objects to provide improved means which will make it possible to greatly reduce the need for repeated handling of said product during the manufacture and drying thereof, and thereby reduce the damage to the wet product and greatly increase the speed with which said product can be manufactured and at the same time reduce the cost and improve the quality thereof.

It is known that plaster lath, wall board and the like is manufactured by rolling wet plastic material between two sheets, and that these surface sheets become saturated with the moisture from the plastic material, and because of this said product is very difficult to handle without considerable damage and waste.

By my invention, I have made it possible to continuously form the product by rolling the plastic material between the cover sheets; to move it along on a horizontal conveyor and to trim it and cut it into desired lengths as it moves; to continue the movement of said separate lengths into individual sheet-receiving spaces in a conveying unit, said conveying unit being moved vertically, intermittently, to successively register the receiving spaces or supports therein with the moving product until said unit is filled; to remove said filled unit bodily and replace it with another unit, transferring the filled unit to a kiln or other place where the drying operation can be carried on without removing the product from said unit.

In accomplishing this, I have provided a receiving and transferring unit capable of receiving the product in flat, horizontal and spaced form upon spaced supports, and in providing guide or feed rollers for directing the wet sheets on to said spaced supports, said feed rollers telescoping into said unit and, by adjustment of the unit, operating to move the product into the separate spaced supports on the level of the feeding of said product from the source of its production. This also makes it possible to use other than highly skilled workmen in the manufacture and handling of the product.

In order to fully describe my invention, I have illustrated on the accompanying two sheets of drawings one practical embodiment thereof, which I will now describe.

Figure 1 is a side elevation of an apparatus embodying my invention, and a part of which is broken away back to the center line longitudinally;

Figure 2 is a vertical transverse sectional view taken on the line 2—2 of Fig. 1;

Figure 3 is a detail sectional view on line 3—3 of Fig. 2;

Figure 4 is a detail sectional view on line 4—4 of Fig. 1;

Figure 5 is a plan view, partly in section and partly broken away showing certain driving connections for the carrier rollers for the product;

Figure 6 is an enlarged detail view of a product holding gate; and

Figure 7 is a sectional detail through one of the vertical rods of the cage or transfer unit, showing how the horizontal supports are spaced and held in place.

I have not shown in the drawings the apparatus for manufacturing the product, but have shown a carrier of the product leading from the source of production and comprising any suitable structure, such as 8, at the right of Fig. 1, with the rollers, 9, 9, spaced therealong, and driven from a motor, M, through connections including a sprocket chain drive, 10, to a shaft 11, with sprocket and chain drive, 12, up through a hole 13, in an overhanging structure 14, to a shaft 15, on top of said structure 14, which shaft 15, carries the roller 9' of the group of rollers 9, on said structure 8, as seen in Figs. 1 and 5. The rollers, 9, 9, are driven by short sprocket chain connections, as 16, along the further side of the structure 8, and as indicated in Fig. 5, all being driven from shaft 15, by connections from one to the other, as indicated, and the shaft being driven from shaft 11, as above referred to.

The finished product is carried along upon said rollers, 9, 9, on said structure 8, in a flat, horizontal position, and is designated P, it being understood that it may be wall board, plaster lath, or any other similar sheet material which is handled wet, or for some other reason it is better to handle in a flat and well supported manner.

I will now describe my novel apparatus for receiving said product, sheet by sheet, in flat, horizontal form and for transferring it to some place for drying or further treatment. An elevator mechanism is provided, here shown to be of hydraulic type, and comprising a frame 17, upon a piston 18, adapted to be operated in a sunken cylinder 19, indicated in light broken lines in Fig. 2, with the controlling mechanism, designated as a whole, 20, with a control lever 21, and with which the operator controls the movements up and down of said elevator frame 17, in a well known manner.

The controlling and operating mechanism 20 for operating said elevator may be briefly described as including a motor driven pump at 22, with reservoir 23, valve chamber 24, pipe therefrom to said sunken cylinder 19, which pipe is designated 25, and is connected to the lower end of said cylinder, as indicated in light lines. The fluid may be water, oil, or other suitable fluid and is pumped from the reservoir 23, to and from the valve chamber 24, and pipe 25, being controlled as to direction by the operation of the valve 24 by the control lever 21, as will be understood from the fact that it is of usual construction. The control lever is operated for the purpose of gradually, step by step, raising the elevator for a purpose again referred to.

The elevator frame 17, is provided with track members 26, 26, in alinement with track members 27 on the structure 8, above the rollers 9, 9, whereby car or cage units can be run from the structure 8, on to said elevator frame 17, when the latter is raised to the proper level, said cage units being designated as a whole U.

Each of said transfer units is made in rectangular, box form with the frame members 28, 28, which may be of angle iron or other suitable material, suitably braced, as at 29, 29, and with a middle frame member 30, extending around the open frame structure. Vertical tiers of horizontal supports 31, 31, indicated as made of inverted channel irons on bolts, 32, 32, with spacing sleeves 33, 33, therebetween are built into said unit structures, as will be clear from Fig. 7, showing the general arrangement in enlarged detail, the bolts being at the opposite sides of the structure, or at the opposite ends of the supports, whereby to leave the space between said side bolts clear so that flat sheets can be moved endwise and edgewise between said supports from one end of the cage or structure to the other and rest upon said horizontal supports, one above the other.

In order to make it possible to move a sheet of wet wall board edgewise through one of said spaces, I have devised a fixed roller mechanism down over which said cage structure is moved in telescoping fashion, and now to be described.

Down in the pit of the elevator shaft, designated 34, are two pairs of vertical plates, 35, 35, with notches 36, in their top edges, and down into these plates to be supported therebetween, are vertical bars, 37, 37, having their lower ends of conical form, as at 37', Fig. 4, to seat and center in a bearing block 38, with a through bolt 39, for each bar, passing through the bar and seated in the opposite notches 36, as clearly indicated in said Fig. 4. The upper ends of said vertical bars are shown as flattened, as at 37$^a$ and provided with a bearing member 40, for supporting a roller 41, said vertical bars being set at opposite sides of the elevtor pit, with the rollers 41, supported at their upper ends and therebetween, across the path of movement of said elevator, as indicated in Figs. 1 and 2, and in such positions as will allow the elevator and the cage unit thereupon to be moved down over said upstanding bars, with the rollers passing upwardly between the tiers of horizontal cross supports 31, 31, as indicated. Stop members 42, 42, are placed in the bottom of the elevator pit 34, to stop the elevator frame, said elevator being adapted to move down into the pit to the position indicated in light broken lines, Fig. 1, in fragment only, but low enough to register the top most horizontal of the cage or unit U with the plane of movement of the product P, the cross rolleds 41, being then positioned between the top horizontal supports and slightly above the same so that when a sheet of material is moved into said unit, said rollers will receive it and carry it through to the further end of the cage or unit and then when the elevator is raised one step, said product will rest upon the horizontal cross supports, 31, 31, and the rollers 41, 41, will be in position to receive and carry the next sheet of product through said unit and leave it upon the next lower support. Said rollers 41, 41, at the upper ends of said bars 37, 37, are driven by means of belts, 43, running over channels 44, in said rollers 41, and sufficiently deep so that the belts will be flush with the roller surface, as clearly indicated in Fig. 4. Said several belts are driven from a series of small pulleys, as 45, 45, in the bottom of the elevator pit, on shafts 46, 46, connected to be driven together by sprocket and chain connections, such as indicated at 47, 47, from the shaft 11, and sprocket chain 11'. Thus all of said rollers are driven together in the same direction and operate to receive and carry the sheet of product through the cage or unit, between the spaced horizontal supports and in position to deposit said product upon said supports as the cage or unit is raised step by step, under the control of the operator at the control lever 21.

In Fig. 1, two cars or cage units are shown together upon the elevator base frame 17, coupled together as by means of connecting links 48 at their tops, or they can be coupled together in any other suitable manner so that long sheets of product P can be moved through both units, thus making it possible to take care of sheets the length of one unit, or of two units together, in the manner indicated in Fig. 1.

As said elevator is moved vertically step by step the product is moved flatwise and edgewise thereinto, spaced and supported upon the horizontal supports and when the last or lower sheet is put through into place, the elevator is sufficiently high to register the tracks 26, 26, thereof, with the tracks 49, upon a structure 50, similar to the structure 8, at the opposite end of the elevator, whereupon the loaded units can be moved from the elevator onto said structure 50, as indicated in light broken lines, and moved to any desired place for drying and curing, as into a drying kiln, and another empty unit can be moved onto said elevator from the structure 8, as indicated by the arrows.

Referring to Fig. 6, which is an enlarged view of the end portion of structure 8, I have provided a gate member 51, on a shaft 52, with a lever 53, normally held in the position shown in full lines by means of a spring 54. This gate member is moved up into the position indicated by the light broken lines between lengths of the product to temporarily stop the movement of the product P while the units are being moved and made ready for filling an empty unit, as will be understood. The end of the product P abuts against said gate 51. As the product is manufactured, it is moved along the structure 8, and trimmed and cut into desired lengths, and these finished lengths of the product are moved onto the portion of the structure 8, here shown, so that it will be understood that I make possible the continuous process in which the finished product, in its fresh, wet condition is moved horizontally, upon spaced and driven rollers, and in a flat condition into separate receiving spaces in the cages or units, and that the cage or unit is then moved bodily to the place of drying or further treatment and the product is not handled until it is fully dried and cured and ready for the market.

In order to prevent the product sheet from moving on through the cage or unit, I provide an end board 55, with hooks 56, 56, adapted to hook over the top of the cage frame and hang down over the stop end, as indicated at the left end of Fig. 1. This can be moved from one cage or unit to the other as desired.

Another important possibility with my improved means for handling wall board, plaster lath and the like is the fact that this product can be unloaded from the cages or receiving units in the same way that it is moved on to them. The cage or unit is simply let down over the horizontally supported rollers, 41, 41, with its load, and as said rollers are driven in the manner hereinbefore described, they will operate as the product reaches them to move said product out of the spaces therein and the product can thus be unloaded on to the conveyor, or discharged one sheet upon the other in a stack, it having been dried and cured and ready for stacking and for the market. This is simply a reversal of the operation, each sheet being removed from the cage or unit by the same mechanism and in the same way that it is moved into the cage or unit.

Thus it will be seen that I have provided a simple and practical method of handling wall board, plaster lath and the like in its wet condition and so as to keep it flat and well supported all the while and have thereby reduced the possibility for damage thereto, and also that the product is not handled otherwise until after it has been fully dried and cured and ready for the market, for the transfer units are designed to be moved bodily, on wheels or otherwise, with the load from place to place, and while I have shown and described one practical embodiment of the invention, I am aware that many changes can be made in the details thereof without departing from the spirit thereof, and I do not limit the invention to the showing made, except as I may be limited by the hereto appended claims.

I claim:

1. In combination with an elevator pit, an elevator, means for moving the same vertically intermittently up and down therein, a series of fixed vertical supports in said pit with horizontal rollers supported thereon at their upper ends and adapted to move through said elevator frame as the latter is raised and lowered thereover, a receiving unit adapted to said elevator and having a series of spaced horizontal supports also adapted to move down over said rollers, said rollers being adapted to be positioned between said horizontal supports as said elevator is moved step by step, and means for removing said receiving unit from said elevator and replacing it with another unit.

2. In the handling of wall board, plaster lath and the like, a conveyor for the product, for conveying it in a flat, horizontal position, a series of fixedly supported horizontal rollers suported in horizontal alinement with said conveyor for said product, means for driving said conveyor and said horizontal rollers together, a receiving unit having a series of vertically spaced horizontal supports for said product, means for supporting and moving said receiving unit bodily down over said fixed horizontal rollers step by step to register said horizontal supports with said horizontal rollers, whereby to facilitate the movement of said product through said receiving unit and on to said horizontal supports, and means for removing said receiving unit when said horizontal supports are loaded with said product.

Signed at Los Angeles, Los Angeles County, California, this 28 day of March, 1927.

ROBERT M. GREENLEAF.